2 Sheets—Sheet 1.

J. RYAN.
STEAM-TRAP.

No. 172,586. Patented Jan. 25, 1876.

Witnesses:
J. W. Herthel.
Chas. F. Meisner.

Inventor.
Joseph Ryan
per Herthel & Co.
Attys.

N. PETERS, PHOTO-LITHOGRAPHER, WASHINGTON, D. C.

J. RYAN.
STEAM-TRAP.

No. 172,586. Patented Jan. 25, 1876.

Witnesses:
J. W. Herthel
Chas. H. Meisner

Inventor:
Joseph Ryan
per Herthel & Co.

UNITED STATES PATENT OFFICE.

JOSEPH RYAN, OF ST. LOUIS, MISSOURI.

IMPROVEMENT IN STEAM-TRAPS.

Specification forming part of Letters Patent No. 172,586, dated January 25, 1876; application filed November 10, 1875.

CASE B.

*To all whom it may concern:*

Be it known that I, JOSEPH RYAN, of St. Louis, Missouri, have invented an Improved Steam-Trap, of which the following is a specification:

It is well known that steam-pipes exposed to a temperature less than the vapor within condense the same and form liquid, which is an annoyance, and not unfrequently the cause of disaster. This latter especially occurs in steam-engines when, upon a temporary stoppage, large quantities of water accumulate; also, frequently the water is carried into the cylinder with the steam, which, if not removed, is a disturbing element. My invention therefore relates to steam traps or condensers, applicable for steam-pipes or all places where steam is used, whether as a motive-power or for heating dwellings, &c.

The nature of my invention consists in the novel combination or sets of valves with a lever or float, as well as to different modifications of the same parts embracing the same operative principle, and all of which will now more fully appear.

Figure 1:
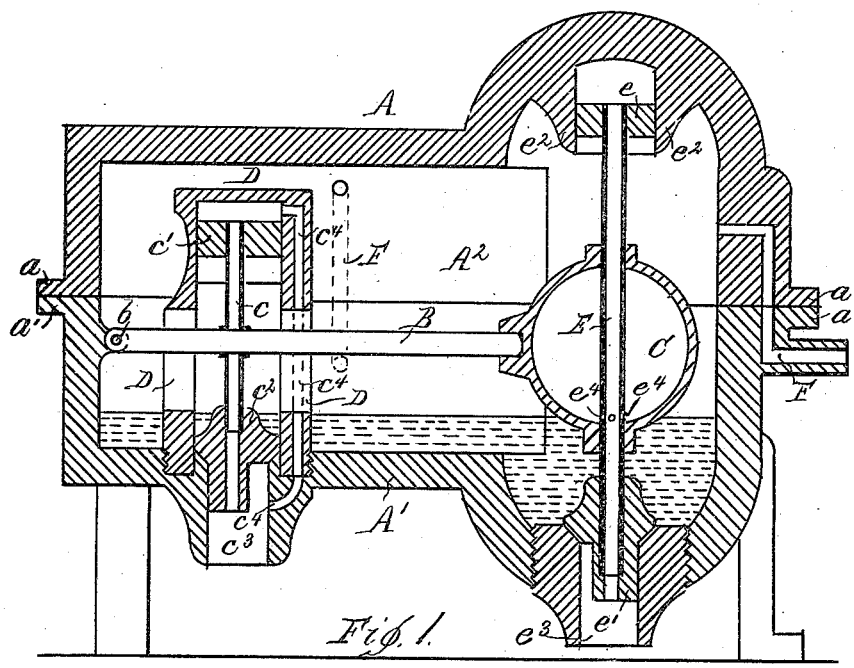
Figure 2:
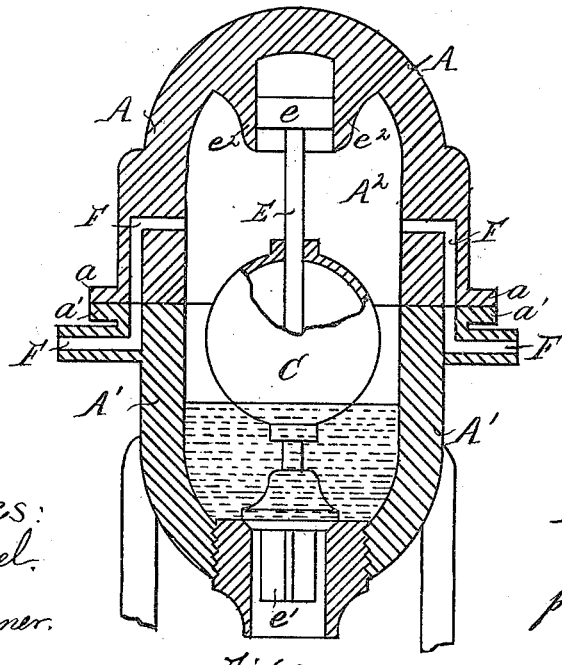
Figure 3:
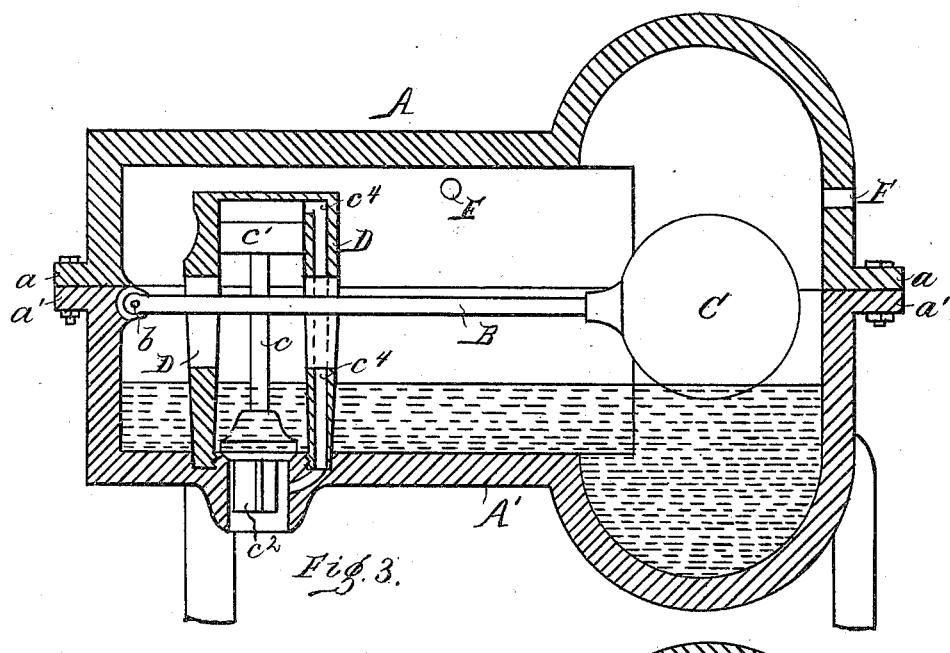
Figure 4:
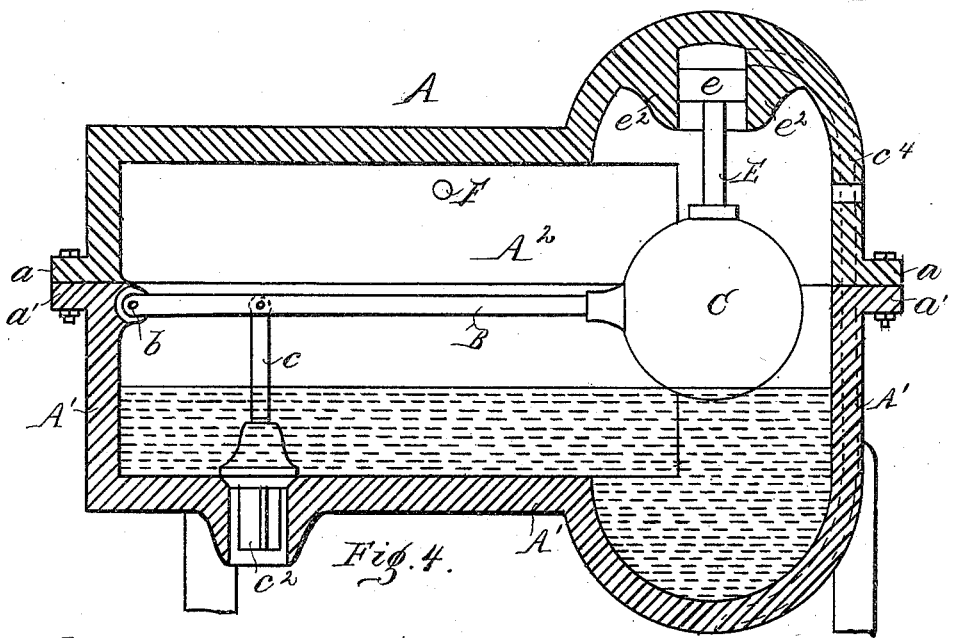

Of the drawing, Figure 1, Sheet 1, represents my invention in sectional elevation. Fig. 2 represents a modification also in section; Figs. 3 and 4, Sheet 2, representing further modifications in section.

The vessel to contain the operating parts I form in two counterpart sections, A A$^1$, so as to be capable of being bolted water-tight by means of bolts passing through the flanges $a$ $a'$. (See figures.) Within the chamber A$^2$ of the apparatus I provide the following parts: B is a lever, having its fulcrum at $b$; the long arm of the lever carries a float, C. The lever B also carries a hollow stem, $c$, and this at its opposite ends has the valves $c^1$ $c^2$, that of $c^1$ being a piston-valve, that of $c^2$ a puppet-valve. (See Figs. 1, 3.) Further, I arrange the stem $c$, with its valves $c^1$ $c^2$, to operate within a valve-chamber, D. This is of the constructive design shown in Figs. 1, 3, forming at top thereof an inner chamber for the valve $c^1$, while the lower part of said chamber D is fixed in the bottom of the apparatus surrounding the seat of the puppet-valve $c^2$, (see Figs. 1, 3) otherwise the opposite walls of the chamber D are slotted to allow for the passage and movements of the lever B, and as indicated in Fig. 1. By this arrangement of the valves $c^1$ $c^2$ the same are balanced by the pressure that takes place within the trap; for, as is apparent, the pressure is on the under face of the piston-valve $c^1$ and on the top face of the puppet-valve $c^2$, and hence the pressure tending to close or keep the lower valve on its seat is counterbalanced by the pressure under the upper valve. It is this manner of obtaining a balance for this set of valves that I lay great stress upon, for it enables me to utilize the full buoyant power of the float, and this can act, therefore, more perfectly to open and close the discharge, and to effect the discharge in accordance with the nature of the requirements. The rising and falling action of the float operates the puppet-valve to close or open its discharge at $c^3$, as the case may be. At same time the piston-valve $c^1$ is also made to rise or fall with the action of the float, whatever air, steam, or water being in the chamber of the valve D, above the piston-valve, being forced out down the hollow stem, through the puppet-valve, and thence out of discharge $c^3$. As apparent, the chamber top of the piston-valve can be made to communicate by a cored port, $c^4$, (see Figs 1, 3, 4,) in one side of the chamber D, to the final discharge, and thus the hollow stem could be avoided. In like manner, as the lever B is provided with the set of valves aforesaid, a similar set can also be provided to form part directly with the float. (See Figs. 1, 2.) Thus, as shown, passing through the float C, is a hollow stem, E, and this carries at its opposite ends the piston-valve $e$ and the puppet-valve $e^1$, the piston-valve operating in a valve-chamber, $e^2$, which is cast to the interior of the chamber A$^2$, (see Fig. 1,) the puppet-valve $e^1$ controlling the further discharge-opening $e^3$ below. The operation of this set of valves $e$ $e^1$ is similar to that of the set $c^1$ $c^2$, above described. The float, rising, lifts both valves, the upper forcing whatever accumulation is top of it down through the hollow stem, and, finally, out of the discharge at $e^3$, and, at same time, the lower valve opening said discharge permits the condensed water to pass out. Small apertures at $e^4$ are made in the stem, so that the float can have its water to pass off through the stem. When both valves are used—that is, $c^1$ $c^2$ and $e$ $e^1$—they act simultaneously, and controlling, as they do, two separate discharge-openings, a greater capacity is imparted to the trap to discharge its water—a feature of importance, because in some traps the accumulation of condensed water is greater than the discharge, my object being to effect a discharge commensurate with the peculiar circumstances to suit the steam-pipe connections, and effect their complete discharge. The steam-pipe connection can be made to the apparatus, as shown in Fig. 1, either in the usual manner, or by means of a side pipe or pipes either attached to or cored, and as indicated by F in the figures.

Fig. 2 represents a modification, it embracing the same operation, but not having as an apparatus the capacity to effect a discharge as that shown in Fig. 1. In Fig. 2 the float has the same set of valves $e$ $e^1$ as those shown in Fig. 1. Likewise the operation of the float operates said valves in manner described above for Fig. 1. In Fig. 3 the set of valves $e$ $e^1$ can be dispensed with from the float, and the single set of $c^1$ $c^2$ used in connection with float, and arranged on lever B. The stem of the valve can be solid, and the accumulations top of piston-valve carried down the cored port $c^4$ out of discharge. In Fig. 4 the arrangement of the set of valves is such that the piston-valve, say $e$, is connected by a solid stem, E, to the float, while the puppet-valve, say $c^1$, controls the discharge, which arrangement positions the parts in the diagonal manner shown in said figure. The cored port $c^4$, shown in dotted lines, carries to the discharge the contents top of the valve $e$; otherwise the operation of Fig. 4 is similar to that of Fig. 1. In all the above modifications, as apparent, the valves are balanced, and, further, in each case the apparatus is rendered self-acting.

What I claim is—

1. The combination of the valve-chamber D, having cored port $c^4$, the valves $c^1$ $c^2$, the lever B carrying a float, C, all said parts being arranged in the manner described, and illustrated in Fig. 1, to operate as and for the purpose set forth.

2. The balanced valves $e$ $e^1$, in combination with a stem, E, carrying a float, C, and arranged in the manner described and illustrated in Figs. 1 and 2.

3. The two sets of balanced valves $c^1$ $c^2$ $e$ $e^1$, the lever B, float C, valve-chamber D, piston-chamber $e^2$, hollow stems C E, or core $c^4$, said parts acting in combination, and arranged in the manner described, and shown in Fig. 1.

In testimony of said invention I have hereunto set my hand.

JOSEPH RYAN.

Witness:
WILLIAM W. HERTHEL.
HARRY C. CLARK.